United States Patent
Peng et al.

(10) Patent No.: US 11,493,800 B2
(45) Date of Patent: Nov. 8, 2022

(54) DISPLAY PANEL WITH BACKREFLECTION SUPPRESSION COMPRISING FIRST AND SECOND BIREFRINGENT LAYERS AND A REFLECTIVITY LAYER

(71) Applicant: Facebook Technologies, LLC, Menlo Park, CA (US)

(72) Inventors: Fenglin Peng, Redmond, WA (US); Dong Chen, Foster City, WA (US); Cheonhong Kim, Mountain View, CA (US); Yusufu Njoni Bamaxam Sulai, Snohomish, WA (US); Ying Geng, Bellevue, WA (US); Jacques Gollier, Sammamish, WA (US); Jianru Shi, Union City, CA (US); Linghui Rao, Bothell, WA (US)

(73) Assignee: META PLATFORMS TECHNOLOGIES, LLC, Menlo Park, CA (US)

(*) Notice: Subject to any disclaimer, the term of this patent is extended or adjusted under 35 U.S.C. 154(b) by 0 days.

(21) Appl. No.: 17/239,245

(22) Filed: Apr. 23, 2021

(65) Prior Publication Data
US 2022/0236564 A1    Jul. 28, 2022

Related U.S. Application Data

(60) Provisional application No. 63/142,765, filed on Jan. 28, 2021.

(51) Int. Cl.
*G02F 1/1335* (2006.01)
*G02B 27/01* (2006.01)
*G02F 1/13363* (2006.01)

(52) U.S. Cl.
CPC ... *G02F 1/133531* (2021.01); *G02B 27/0172* (2013.01); *G02F 1/13363* (2013.01); *G02F 1/133526* (2013.01)

(58) Field of Classification Search
CPC ......... G02F 1/133531; G02F 1/133543; G02F 1/133541
See application file for complete search history.

(56) References Cited

U.S. PATENT DOCUMENTS 6,781,664 B1    8/2004  Heckmeier et al.
2007/0279556 A1 * 12/2007 Wang ............... G02F 1/13363
                                                      349/96

(Continued)

FOREIGN PATENT DOCUMENTS

JP    2020170147 A    10/2020
WO   2019236132 A1   12/2019

OTHER PUBLICATIONS

International Search Report and Written Opinion for International Application No. PCT/US2022/012690, dated May 11, 2022, 13 pages.

*Primary Examiner* — Paul C Lee
(74) *Attorney, Agent, or Firm* — Pequignot + Myers; Matthew Pequignot

(57) ABSTRACT

Ghost image formation due to reflections of image light by a display panel to an ocular lens may be suppressed by ensuring that the image light reflected by the lens does not get reflected by the display panel back towards the lens. To that end, the display panel may include a quarter-wave birefringent layer between the top polarizer of the display panel and a layer inside the display panel that the image light reflects from, such as a black grid layer or an active matrix layer.

20 Claims, 11 Drawing Sheets

(56) References Cited

U.S. PATENT DOCUMENTS

| | | |
|---|---|---|
| 2010/0201928 A1 | 8/2010 | Kubo et al. |
| 2012/0218497 A1 | 8/2012 | Kajita |
| 2013/0002994 A1* | 1/2013 | Wang ................ G02F 1/133528 349/96 |
| 2018/0231844 A1 | 8/2018 | Sakai et al. |
| 2018/0337219 A1* | 11/2018 | Rhee .................... G02B 5/3083 |
| 2020/0257166 A1 | 8/2020 | Smith et al. |

* cited by examiner

DISPLAY PANEL WITH BACKREFLECTION SUPPRESSION COMPRISING FIRST AND SECOND BIREFRINGENT LAYERS AND A REFLECTIVITY LAYER

REFERENCE TO RELATED APPLICATION

This application claims priority from U.S. Provisional Application No. 63/142,765 entitled "Display Panel with Backreflection Suppression", filed on Jan. 28, 2021, and incorporated herein by reference in its entirety.

TECHNICAL FIELD

The present disclosure relates to visual displays, and in particular to birefringent display panels such as liquid crystal display panels, and visual displays based thereon.

BACKGROUND

Visual displays are used to provide information to viewer(s) including still images, video, data, etc. Visual displays have applications in diverse fields including entertainment, education, engineering, science, professional training, advertising, to name just a few examples. Some visual displays, such as TV sets, display images to several users, and some visual display systems are intended for individual users. Visual displays are viewed either directly, or by means of special glasses that may include optical shutters, as well as special varifocal lenses.

An artificial reality system generally includes a near-eye display (e.g., a headset or a pair of glasses) configured to present content to a user. A near-eye display may display virtual objects or combine images of real objects with virtual objects, as in virtual reality (VR), augmented reality (AR), or mixed reality (MR) applications. For example, in an AR system, a user may view images of virtual objects (e.g., computer-generated images (CGIs)) superimposed onto surrounding environment. In some near-eye displays, each eye of the user views an image in linear domain displayed on a miniature display panel and observed through an ocular lens.

Compact and efficient display systems are desired for head-mounted displays. Because a display of HMD or NED is usually worn on the head of a user, a large, bulky, unbalanced, and/or heavy display device would be cumbersome and may be uncomfortable for the user to wear. Highly integrated compact near-eye displays sometimes suffer from loss of visual contrast and/or ghost image problems.

BRIEF DESCRIPTION OF THE DRAWINGS

Exemplary embodiments will now be described in conjunction with the drawings, in which.

DETAILED DESCRIPTION

Figure 1:
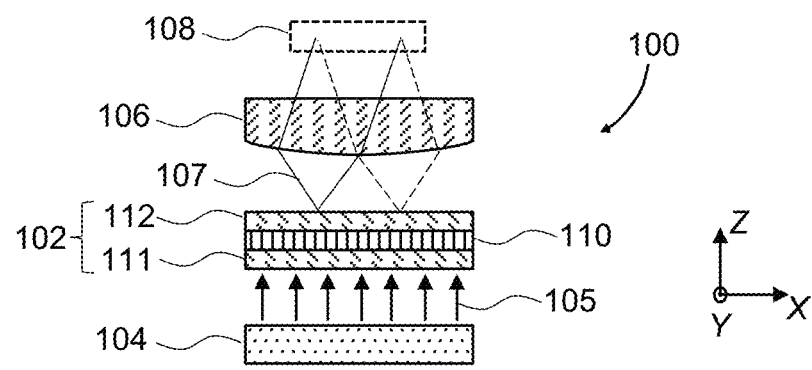
FIG. 1 is a side cross-sectional view of a display device of this disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

A near-eye display may include a backlit transmissive display panel and an ocular lens in front of the panel. The ocular lens converts an image in linear domain displayed by the display panel into an image in angular domain for direct observation by an eye placed in front of the ocular lens. Reflections of image light from the ocular lens back to the display panel may cause ghost images to appear. Ghost images are formed when image light reflected by the ocular lens is reflected again by the display panel towards the viewer's eye. The image light reflected from the display panel follows the normal light path through the ocular lens, forming a ghost image. Pancake lenses that provide beam path folding by polarization are particularly sensitive to ghost image formation because pancake lenses include a partial reflector that may reflect the image light towards the display panel.

In accordance with this disclosure, the ghost image formation due to reflections of the image light by the display panel may be suppressed by ensuring that the image light reflected by the lens towards the display panel does not get reflected by the display panel back towards the lens. To that end, the display panel may include a quarter-wave birefringent layer between the top polarizer of the display panel and a layer inside the display panel that the image light reflects from. Such a layer may include, for example, a black grid on a color filter array, the color filter array itself, a thin film transistor (TFT) matrix, or any partially reflective dielectric interface within the display panel. Upon propagating through the quarter-wave layer and reflection from the partially reflective layer in the display panel, the light propagates again through the quarter-wave layer and changes its polarization to an orthogonal polarization, which is blocked by the top polarizer, suppressing the reflection and associated ghost images. The display may be operated by tuning or switching birefringence of another quarter-wave layer in a spatially-selective manner, to modulate the transmission of light through the display panel in a spatially-selective manner. In some embodiments, the spatially tunable or switchable quarter-wave layer is placed upstream of the reflective layer, and the non-switchable quarter-wave layer is placed downstream of the reflective layer. The polarization-based reflection suppression results in suppression of the ghost images carried by the reflected light.

In accordance with the present disclosure, there is provided a display panel comprising a first birefringent layer for receiving polarized light emitted by a backlight, a finite reflectivity layer for receiving the light propagated through the first birefringent layer, a second birefringent layer for receiving the light propagated through the finite reflectivity layer, and a first polarizer for receiving the light propagated through the second birefringent layer. The second birefringent layer is configured to convert a polarization state of an image light portion propagating in sequence through the first polarizer, the second birefringent layer, reflected from the finite reflectivity layer, and propagating back through the second birefringent layer towards the first polarizer, to an orthogonal polarization state that is blocked by the first polarizer.

The display panel may include a second polarizer for polarizing the light emitted by the backlight. At least one of the first or second birefringent layers may have an optical retardation of substantially an odd number of quarter-wavelengths.

In some embodiments, the finite reflectivity layer comprises a grid layer defining an array of pixels of the display panel. The second birefringent layer comprises an array of openings coordinated with the array of pixels, such that in operation, the light propagated through pixels of the array of pixels propagates through corresponding openings of the array of openings. The second birefringent layer is configured to convert the polarization state of the image light portion propagating in sequence through the first polarizer, the second birefringent layer between the openings, reflected from the grid layer, and propagating back through the second birefringent layer between the openings and towards the first polarizer, to the orthogonal polarization state. The second birefringent layer may have a substantially zero optical retardation for light propagated through the openings in the second birefringent layer, and a substantially an optical retardation of odd number of quarter-wavelengths for light propagated between the openings in the second birefringent layer. The second birefringent layer may include a quarter-wave coating on the grid layer.

In some embodiments, the first birefringent layer comprises a liquid crystal layer having an optical retardation of substantially an odd number of half-wavelengths. The finite reflectivity layer comprises a matrix layer configured to tune the optical retardation of the liquid crystal layer in a spatially-selective manner. The matrix layer may include a thin film transistor (TFT) matrix layer, for example. The finite reflectivity layer may include at least one of: a black grid, a color filter matrix, or a TFT matrix for tuning the optical retardation of at least one of the first or second birefringent layers in a spatially selective manner. The at least one of the first or second birefringent layers may include a liquid crystal (LC) layer.

In embodiments where the finite reflectivity layer comprises a matrix layer, the display panel may further include a vertically aligned LC layer adjacent the matrix layer. The matrix layer may be configured to tune the LC layer between a state having substantially zero optical retardation and a state having a non-zero optical retardation. Optical retardations of the first and second birefringent layers may be selected so as to cancel each other out. The first and second birefringent layers may each have an optical retardation of substantially an odd number of quarter-wavelengths. Due to a lower overall retardation than in a typical half-retardation LC layer used in LC displays, liquid crystals of the LC layer may have a lower optical birefringence, e.g. less than 0.2, or less than 0.1, or even lower.

In accordance with the present disclosure, there is provided a display panel comprising a grid layer having a finite reflectivity, for receiving polarized light emitted by a backlight, and an LC layer. The grid layer defines an array of LC pixels in the LC layer. Optical retardation of pixels of the array of LC pixels is individually controllable. A patterned birefringent layer includes an array of openings coordinated with the array of LC pixels, such that in operation, the light propagated through the LC pixels propagates through openings of the array of openings. A polarizer is configured for receiving the light propagated through the array of LC pixels and the array of openings, thereby forming image light. The patterned birefringent layer is configured to convert a polarization state of a portion of the image light reflected towards the polarizer and propagating in sequence through the polarizer and the patterned birefringent layer between the openings, reflected by the grid layer, and propagating back through the birefringent layer between the openings towards the polarizer, to an orthogonal polarization state that is blocked by the polarizer. The patterned birefringent layer may have an optical retardation of substantially an odd number of quarter-wavelengths.

In accordance with the present disclosure, there is further provided a display device comprising first and second polarizers, a backlight coupled to the second polarizer, a first birefringent layer for receiving light emitted by the backlight and polarized by the second polarizer, a grid layer for receiving and spatially modulating at least one of polarization or color of the light propagated through the first birefringent layer, and a second birefringent layer for receiving the light propagated through the grid layer. The first polarizer is disposed for receiving the light propagated through the second birefringent layer and a lens, optically coupled to the first polarizer for forming an image in angular domain from an image in linear domain formed at the first polarizer. The second birefringent layer is configured to convert the polarization state of a portion of the light reflected by the lens towards the first polarizer and propagating in sequence through the first polarizer, the second birefringent layer between the openings, reflected from the grid layer, and propagating back through the second birefringent layer between the openings and towards the first polarizer, to an orthogonal polarization state that is blocked by the first polarizer.

The grid layer may include e.g. at least one of a color filter matrix, a black grid, or a TFT matrix for tuning optical retardation of at least one of the first or second birefringent layers in a spatially-selective manner. In embodiments where the grid layer comprises the TFT matrix, the at least one of the first or second birefringent layers may include an LC layer, and the TFT matrix may be configured for tuning optical retardation of the LC layer in the spatially-selective manner. In embodiments where the lens is a pancake lens, the latter may include a first lens element optically coupled to the first polarizer, and a second lens element optically coupled to the first lens element. The first lens element may include a curved partial reflector, and the second lens element may include a curved reflective polarizer.

Referring now to FIG. 1, a display device 100 includes a display panel 102 and a backlight 104 optically coupled to a display panel 102. The display panel 102 may include first 111 and second 112 polarizers, e.g. linear polarizers, the backlight being optically coupled to the first polarizer 111. The backlight 104 provides illuminating light 105 to the display panel 102. An ocular lens 106 is optically coupled to the second polarizer 112 for collimating image light beams 107 emitted by individual pixels of the display panel 102. The image light beams 107 are collimated at an eyebox 108, forming an image in angular domain at the eyebox 108. Herein and throughout the rest of the specification, the term "eyebox" means a geometrical area where image of an acceptable quality may be formed by a display device.

The display panel 102 includes an array 110 of tunable polarization rotators disposed in XY plane between the first 111 and second 112 polarizers. The tunable polarization rotators of the array 110 selectively rotate or otherwise modify polarization of the illuminating light 105 polarized by the first polarizer 111. The array 110 may include, for example, a liquid crystal (LC) layer between a pair of transparent electrodes, one of which may be pixelated to provide spatially varying electric field for reorienting, e.g. tilting and/or rotating, LC molecules of the LC layer. A display panel with an LC layer is termed liquid crystal display (LCD) panel. The image light 107 is formed when the illuminating light 105 having spatially-variant polarization propagates through the second polarizer 112. The purpose of the ocular lens 106 is to form an image in angular domain from the image in linear domain at the second polarizer 112. The image in angular domain is formed at the eyebox 108 for direct observation by a user's eye placed at the eyebox 108.

Figure 2A:
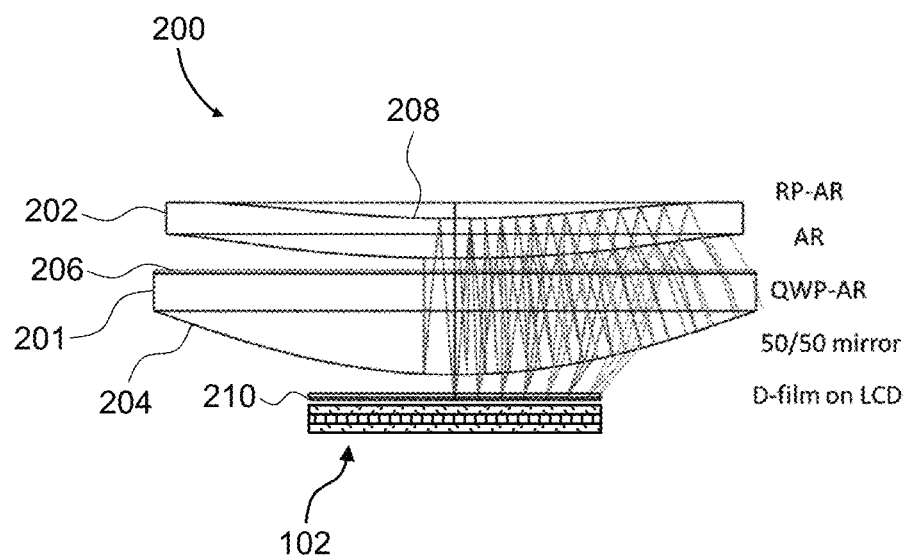
FIG. 2A is a cross-sectional ray-traced view of a pancake ocular lens usable in the display device of FIG. 1.

Referring to FIG. 2A, a pancake lens 200 is one implementation of the ocular lens 106 of the display device 100 of FIG. 1. The pancake 200 of FIG. 2A includes a first lens element 201 optically coupled to the display panel 102, and a second lens element 202 optically coupled to the first lens element 201. The first lens element 201 may include a curved partial reflector 204 ("50/50 mirror") on one side and a quarter-wave plate (QWP) 206, and the second lens element may include a curved reflective polarizer (RP) 208. Air interfaces of the pancake lens 200 may include anti-reflection coatings. The display panel 102 may include a QWP on its top linear polarizer, forming a so-called D-film 210.

Figure 2B:
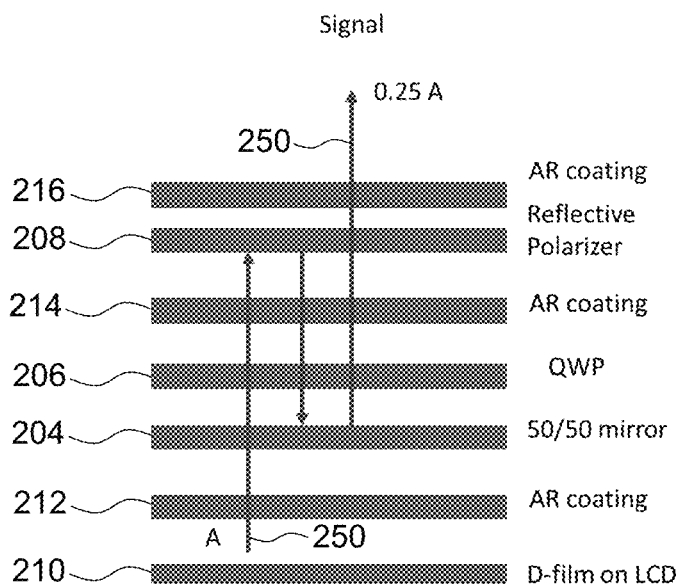
FIG. 2B is s schematic view of the image forming light path in the pancake lens of FIG. 2A.

Referring to FIG. 2B with further reference to FIG. 2A, image light 250 of an amplitude A propagates through the D-film 210 and becomes circularly polarized. The image light 250 propagates through an AR coating 212 of the D-film 210, the partial reflector 204 and the QWP 206 of the first lens element 201, AR coatings 214 of the QWP 206 and the second lens element 202, and is reflected by the reflective polarizer 208 of the second lens element 202. The image light 250 is reflected by the reflective polarizer 208 because upon propagation through the QWP 206, the circularly polarized image light 250 becomes orthogonally linearly polarized. Then, the image light 250 propagates back through the AR coatings 214 and the QWP 206, is reflected by the partial reflector 204, propagates again through the QWP 206 and becomes linearly polarized again at a direction orthogonal to the linear polarization on the first pass. This causes the image light 250 to propagate through the reflective polarizer 208 and its AR coating 216. On its path, the image light 250 reflects from two curved surfaces—the partial reflector 204 and the reflective polarizer 208—and is refracted by a refractive surface of the second lens element 202, effectively collimating the image light 250 emitted by each pixel of the display panel 102. The transmission throughput of the pancake lens 200 is up to 25% due to the image light 250 reflecting once and transmitting once through the partial reflector 204, which may be a 50/50 reflector to maximize the overall optical throughput.

Figure 3:
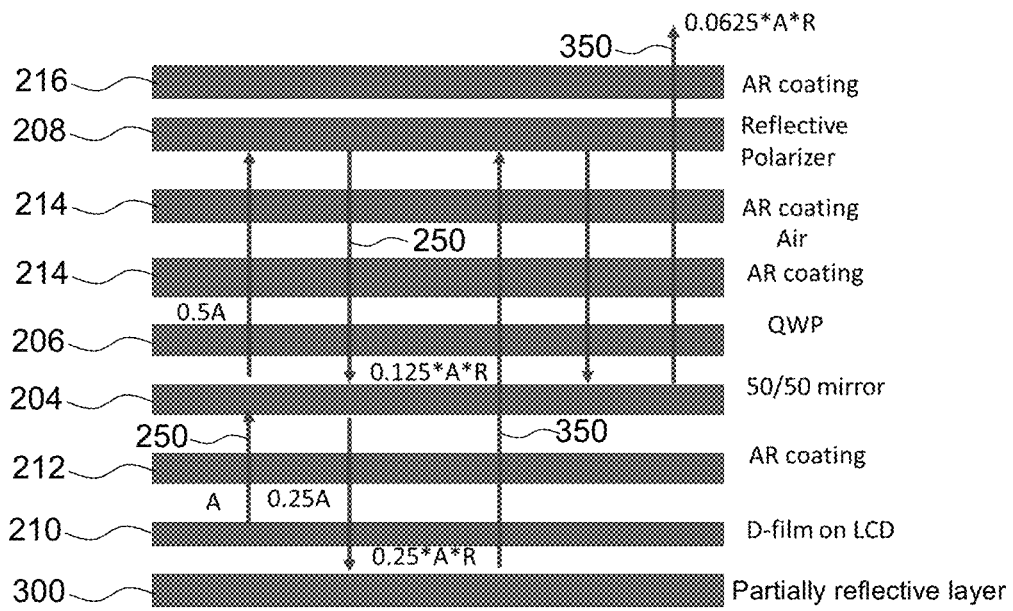
FIG. 3 is a schematic view of the ghost image forming light path in the pancake lens of FIG. 2A.

Turning now to FIG. 3 with further reference to FIGS. 2A and 2B, a main ghost image forming path in the pancake lens 200 is illustrated. The image light 250 propagates (FIG. 3) through the AR coating 212 of the D-film 210, the partial reflector 204 (50/50 mirror) and the QWP 206 of the first lens element 201 (FIG. 2A), AR coatings 214 of the QWP 206 (FIG. 3) and the second lens element 202, and is reflected by the reflective polarizer 208 of the second lens element 202 to propagate back. So far, the path of the image light 250 is the same as in FIG. 2B. The image light 250 propagates through the partial reflector 204 (FIG. 3), the AR coating 212, the D-film 210, and enters the display panel 102 (FIG. 2A), where it reflects from a layer 300 (FIG. 3) having a finite reflectivity. The reflectivity of the layer 300 is a source of ghost-causing reflection in the display panel 102. By way of non-limiting examples, the layer 300 may be a matrix layer such as color filter matrix, a black grid defining pixels of the display panel 102, a thin film transistor (TFT) matrix layer, or a dielectric interface layer.

Subsequently, a reflection 350 follows the path of the image light 250, propagating through various layers to the reflective polarizer 208, being reflected by the reflective polarizer 208, propagating through the AR coatings 214 and the QWP 206, being reflected by the partial reflector 204, propagating again through the QWP 206 and becoming linearly polarized. The reflection 350 propagates through the reflective polarizer 208 and its AR coating 216, forming a ghost image. The total amplitude of the reflection 350 is approximately 0.0625*A*R, where A is the amplitude of the image light exiting the D-film 210 of the display panel 102, and R is the non-zero reflection coefficient of the layer 300. Other paths for the reflection 350 are possible, and will be considered further below with reference to FIGS. 8A to 8D.

Figure 4A:
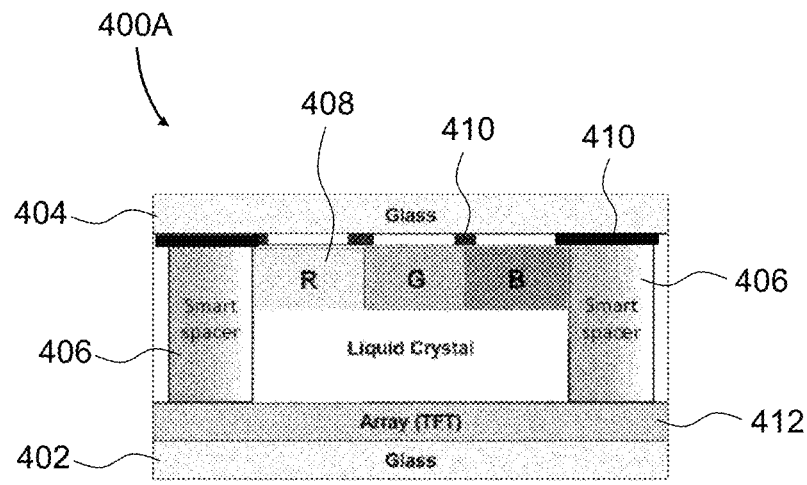
FIG. 4A is a side cross-sectional schematic view of a liquid crystal (LC) display panel embodiment with RGB filter matrix and thin film transistor (TFT) matrix disposed on opposed transparent substrates.
Figure 4B:
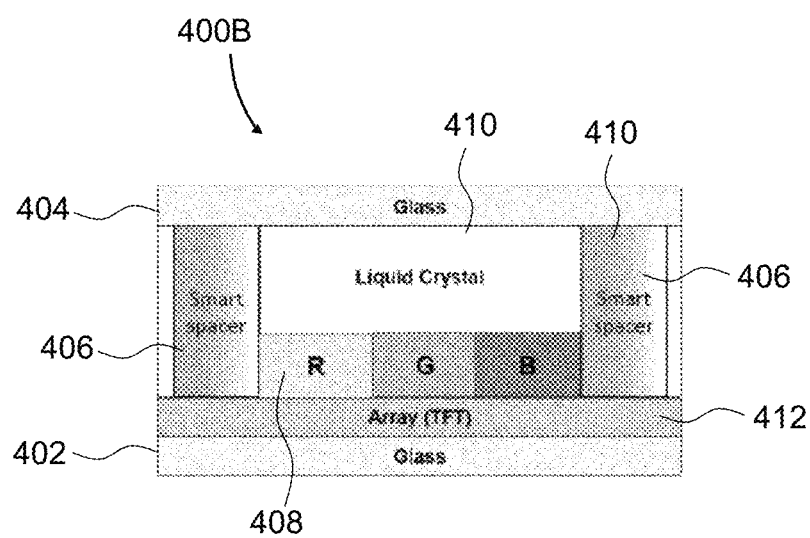
FIG. 4B a side cross-sectional schematic view of an LC display panel embodiment with RGB filter matrix disposed on top of the TFT matrix.

Non-limiting examples of the layer 300 giving rise to unwanted reflections and associated ghost images will now be presented. Referring first to FIG. 4A, an LCD panel 400A may be used as the display panel 102 of the display device 100 of FIG. 1. The LC display panel 400A of FIG. 4A includes TFT 402 and color filter 404 transparent substrates, e.g. glass or plastic substrates, spaced apart by "smart spacers" 406 that may be patterned on the TFT substrate 402 to define inter-pixel areas between RGB color pixels of a color filter layer 408. The spacers 406 provide the required "cell gap", i.e. a gap between the TFT 402 and color filter 404 substrates. A black grid layer 410 may be provided to define the RGB pixels of the display panel 400A and to shield a TFT matrix film 412 on the TFT substrate 402. The cavity between the TFT 402 and color filter 404 substrates is filled with an LC fluid. The reflecting layer may be any of the layers of FIGS. 4A, 4B, e.g. the color filter or color matrix layer 408, the TFT matrix film on the TFT layer 402, the black grid layer 410. FIG. 4B shows an LC display panel 400B where the color filter layer 408 is placed on the TFT substrate 402 instead of the top substrate.

Figure 5A:
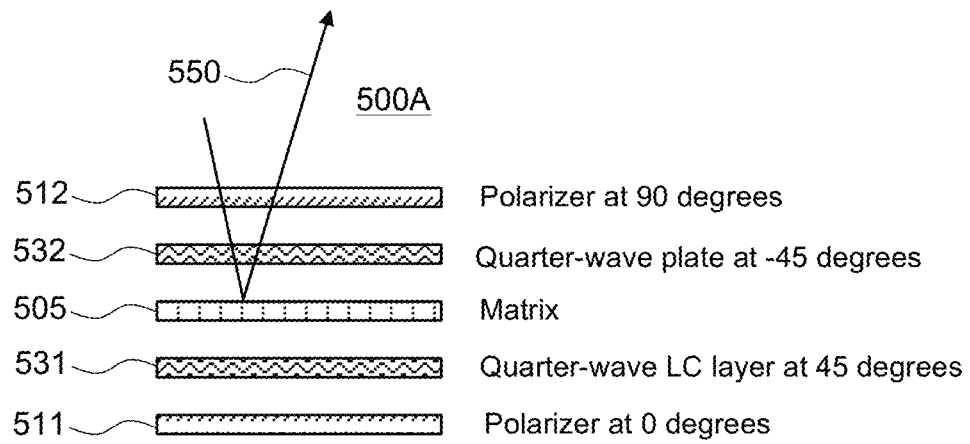
FIG. 5A is an exploded cross-sectional side view of an embodiment of the display panel for the display device of FIG. 1.
Figure 5B:
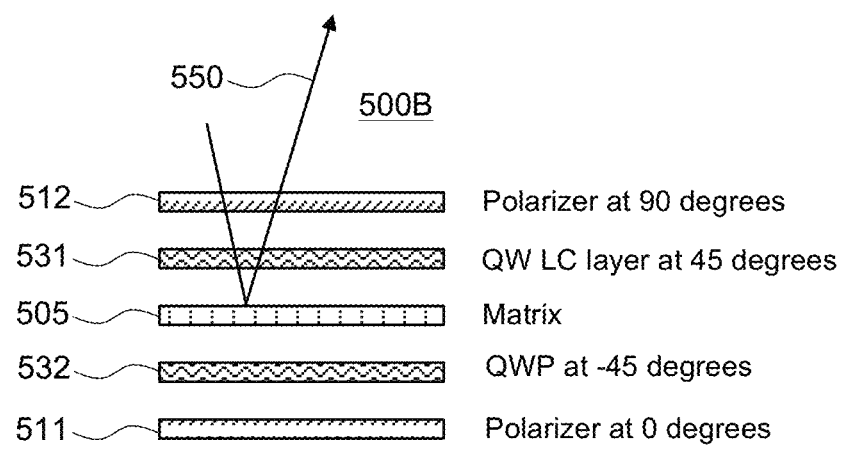
FIG. 5B is an exploded cross-sectional side view of another embodiment of the display panel for the display device of FIG. 1.
Figure 5C:
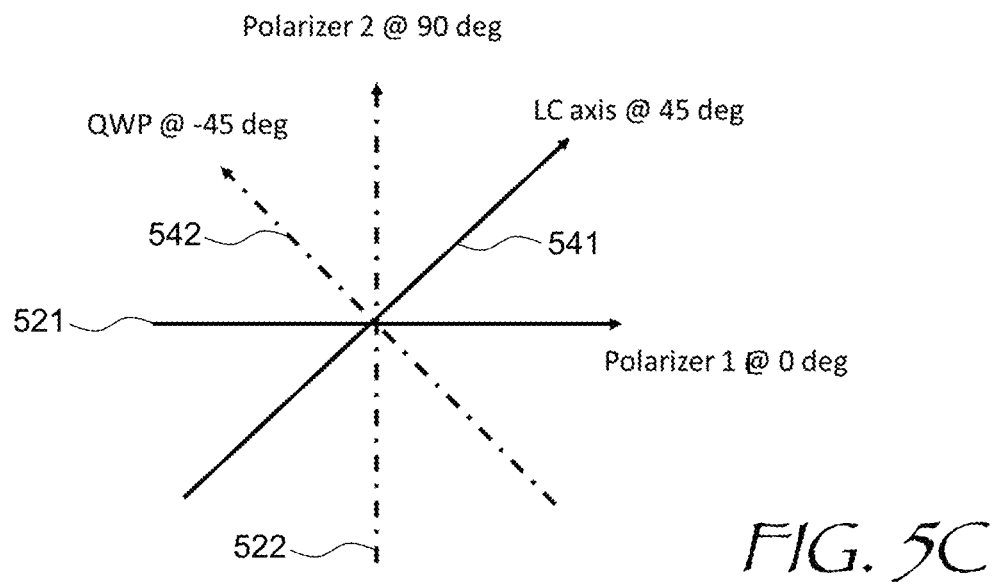
FIG. 5C is a plan-view polarization diagram showing example optical and transmission axes directions of the display panel embodiments of FIGS. 5A and 5B.

Referring now to FIGS. 5A and 5C, a configuration of a display panel 500A with reflection suppression is presented. The display panel 500A may be used as the display panel 102 of the display device 100 of FIG. 1 for the purpose of providing images in linear domain while suppressing ghost image formation. The display panel 500A of FIG. 5A may include a first polarizer 511, e.g. a linear polarizer having a first transmission axis 521 (FIG. 5C), a first birefringent layer, e.g. a first quarter-wave layer, such as a quarter-wave LC layer 531 (FIG. 5A) having a first optic axis 541 (FIG. 5C) at substantially 45 degrees to the first transmission axis 521, a finite reflectivity layer such as a matrix layer 505 as a source of an unwanted ghost-causing reflection, and a second birefringent layer, e.g. a quarter-wave plate 532 having a second optic axis 542.

The second quarter-wave layer 532 may be e.g. a LC polymer (LCP) layer. The second quarter-wave layer 532 may be a compound waveplate comprising a stack of anisotropic materials. The matrix layer 505 may be e.g. a black grid or matrix defining pixels of the display panel 500A, a color filter matrix, a TFT matrix configured for tuning birefringence of the LC layer in a spatially-selective manner, a spacer matrix, etc. The TFT matrix may be configured, for example, to tune the birefringence of the LC layer by rotating the first optic axis 541 in-plane of LC layer in a spatially selective manner. That is, the orientation of the LC optic axis, also referred to as LC director, may be tuned in a spatially-selective manner e.g. by fringe electric fields generated by the TFT matrix. More generally, the matrix layer 505 may receive and spatially modulate at least one of polarization (e.g. rotate linear polarization) or color (e.g. do color filtering) of the propagating light.

A second polarizer 512 may be a linear polarizer having a second transmission axis 522 at substantially 45 degrees (i.e. within 5 degrees of 45 degrees) to the second optic axis 542. The mutual orientations of the first 521 and second 522 transmission axes of the first 511 and second 512 linear polarizers, respectively, and the first 541 and second 542 optic axes of the first 531 and second 532 quarter-wave layers, respectively, is illustrated in FIG. 5C. As shown, the first 521 and second 522 transmission axes may be substantially (i.e. within 5 degrees) perpendicular to each other. The first 541 and second 542 optic axes may also be substantially perpendicular to each other.

Herein and throughout the rest of the specification, the term "quarter-wave" in expressions "quarter-wave layer" or "quarter-wave plate" means a layer or an optical retardation of an odd number of quarter wavelengths. Herein and throughout the rest of specification, the term "substantially" when applied to magnitude of optical retardation denotes a tolerance of $+/-\frac{1}{10}^{th}$ of a wavelength. Herein and throughout the rest of specification, the terms "birefringent layer" is taken to be equivalent to the term "waveplate". Furthermore, the term "layer" is not taken to mean a single layer, and may include a plurality or a stack of sub-layers. Several sub-layers of same or different optical retardation may be oriented such that their optic axes form non-zero and non-orthogonal angles w.r.t. each other, e.g. to achieve a broadband wavelength performance of the compound birefringent layer or waveplate. It is also noted that the quarter-wave optical retardation of the first and second birefringent layers is meant only as example, and is generally not limited to a particular value or values. For example, the retardation of the actively tuned or switched layer, such as the LC layer, does not have to be equal to a quarter wavelength or an odd multiple of quarter wavelengths. The retardation of the other birefringent layer also does not have to be equal to a quarter wavelength or an odd multiple of quarter-wavelengths. Other retardation values may be useful for reduction of the reflection 550.

When a pixel of the LC layer 531 is not driven i.e. is in an undriven state, the birefringence or optical retardations of the LC layer 531 and the quarter-wave plate layer 532 cancel each other out and, accordingly, the pixel is in the dark state. Such a configuration is called "drive-to-white" configuration. When the pixel of the LC layer 531 is driven, the birefringence of the LC layer 531 and the quarter-wave plate layer 532 does not cancel out, and the pixel transmits some light. For some in-plane switching configurations, the LC pixel may be driven to rotate the first optic axis 541 by 90 degrees, in which case the LC pixel will transmit maximum amount of light, limited only by absorption in the stack. Drive-to-black configurations, when the LC layer is driven to darken the pixel, are also possible.

Regardless of the state of the LC layer 531, impinging image light 550, e.g. a portion of image light reflected from the pancake lens 200 of FIG. 2, propagates through the second linear polarizer 512, the quarter-wave plate 532, is reflected by the matrix layer 505, and propagates back through the quarter-wave plate 532, which at this point rotates the polarization of the light 550 by 90 degrees to an orthogonal polarization state, causing the light 550 to be effectively blocked by the second linear polarizer 512, thereby suppressing ghost image formation.

A display panel 500B of FIG. 5B is similar to the display panel 500A of FIG. 5A, the difference being that the quarter-wave layers 531 and 532 are swapped. The display panel 500B of FIG. 5B operates similarly to the display panel 500A of FIG. 5A. The reflection suppression performance is the same as for the display panel 500A of FIG. 5A when the LC layer 531 is not driven, e.g. in dark state in a drive-to-white scheme. When the LC layer 531 is driven, the reflected light propagated twice through the LC layer 531 will not be perfectly linear polarized, but rather will be elliptically polarized; a significant portion of that light will nonetheless be blocked by the second polarizer 512. In addition to reducing unwanted reflections, the configurations of the display panels 500A and 500B provide faster LC switching time. If the cell gap of the LC layer 531 is twice thinner than a half-wavelength LC layer, the response time can be four times faster. In some embodiments, low-birefringence LC materials may be used to achieve a quarter-wave optical retardation at a same cell gap as a conventional LC panel that typically has a half-wave retardation. By way of a non-limiting example, liquid crystals of the LC layer may have an optical birefringence of less than 0.2; less than 0.1; or even less than 0.05. The lower birefringence can result in a lower dispersion, lower viscosity, and faster response time. The quarter-wave plate layer 532 may be a single layer or a multilayer used e.g. to make the quarter-wave plate more broadband, i.e. have a wider optical spectrum of quarter-wavelength retardation.

Figure 6:
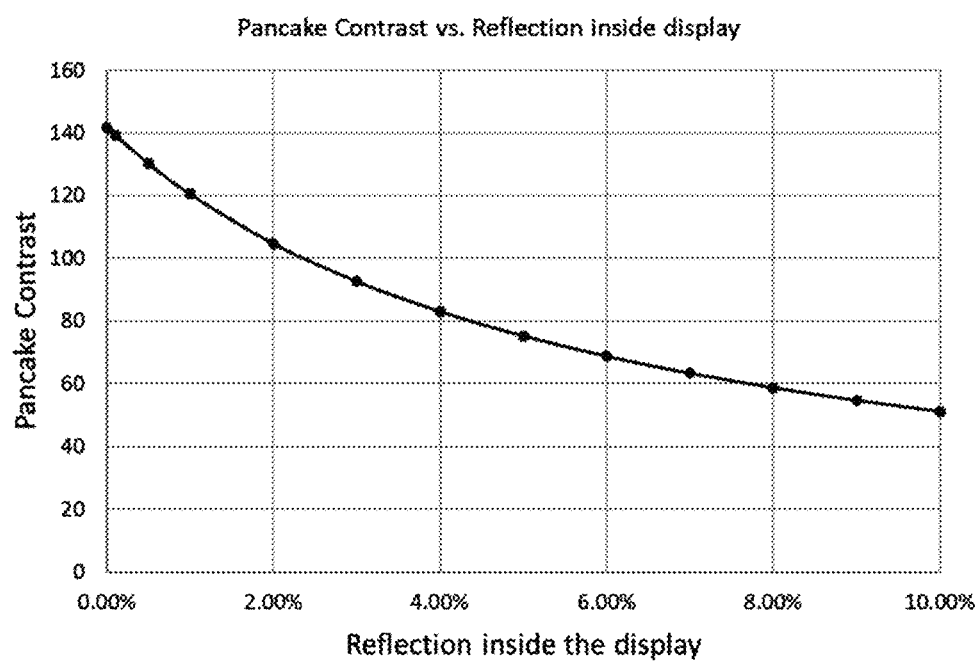
FIG. 6 is a graph of the display visual contrast as a function of a magnitude of reflections inside the display panel.

Referring to FIG. 6, the contrast ratio of an image provided by a pancake lens, e.g. the pancake lens 200 of FIG. 2, depends on the magnitude of reflection inside the display panel. In the graph of FIG. 6, the LCD panel is taken to have infinite contrast ratio for illustration purposes. Decreasing the reflection magnitude enables one to significantly increase the image contrast. The contrast ratio is defined as a white pixel optical power level divided by a black pixel optical power level.

Figure 7:
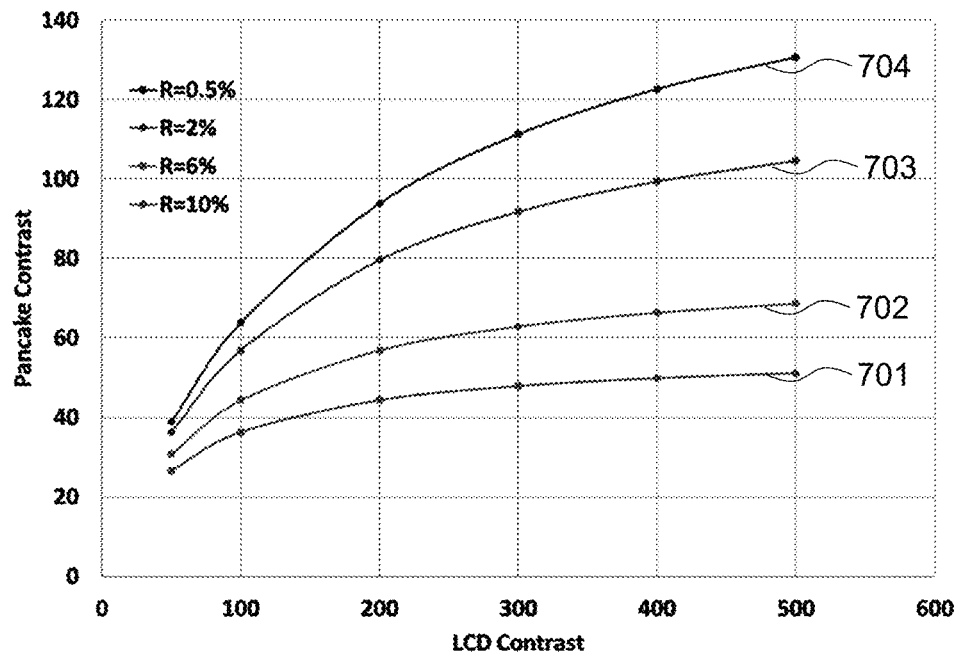
FIG. 7 is a graph of visual contrast of the display device as a function of the visual contrast of the display panel at several magnitudes of reflections inside the display panel.

Turning to FIG. 7, the effect of a finite contrast ratio of the LCD panel is illustrated. Curves 701, 702, 703, and 704 correspond to the reflection from an inside layer of the LCD panel of 10%, 6%, 2%, and 0.5% respectively. It is seen that the overall contrast ratio improves when the LCD panel contrast ratio is improved, and when the in-panel reflections are suppressed.

FIGS. 8A, 8B, 8C, and 8D, illustrate various alternative paths of reflected light in a display device, e.g. the display device 100 of FIG. 1, with a pancake lens, e.g. the pancake lens 200 of FIG. 2. The term "C" denotes a reflection coefficient of an antireflective coating, and R denotes reflectivity of the finite reflectivity layer 300 within the display panel, such as black matrix (BM) layer. A is the amplitude of the impinging beam. The main ghost image forming path has been considered above with reference to FIG. 3. It's amplitude is 0.0625*A*R.

Figure 8A:
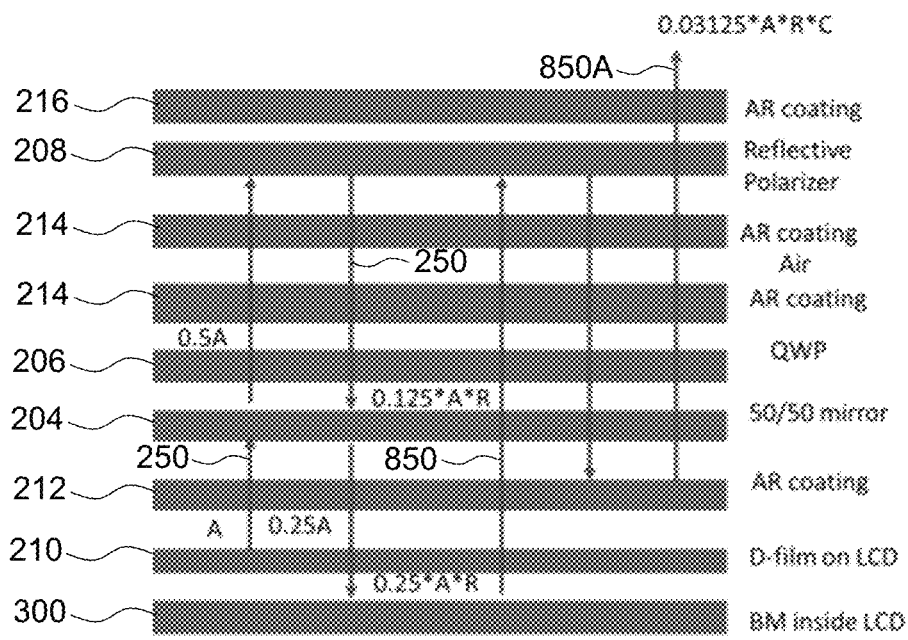
FIGS. 8A-8D are schematic views of other possible ghost image forming light paths in the display device of FIG. 1.

Referring first to FIG. 8A with further reference to FIG. 2A, the image light 250 propagates through the AR coating 212 of the D-film 210, the partial reflector 204 (50/50 mirror) and the QWP 206 of the first lens element 201 (FIG. 2A), AR coatings 214 of the QWP 206 (FIG. 8A) and the second lens element 202, and is reflected by the reflective polarizer 208 of the second lens element 202 to propagate back. The image light 250 propagates through the partial reflector 204, the AR coating 212, the D-film 210, and enters the display panel 102 (FIG. 2A), where it reflects from a layer 300 (FIG. 8A) having a finite reflectivity, e.g. a BM layer inside the LCD stack. The reflectivity of the layer 300 is a source of ghost-causing reflection in the display panel 102.

Subsequently, a reflection 850 propagates through the stack upwards in FIG. 8A until it reaches the reflective polarizer 208, which reflects the light to propagate back to the AR coating 212 of the D-film 210. A small portion 850A of light is reflected by the AR coating 212 to propagate outside of the stack. The amplitude of the portion 850A is approximately equal to 0.03125*A*R*C.

Figure 8B:
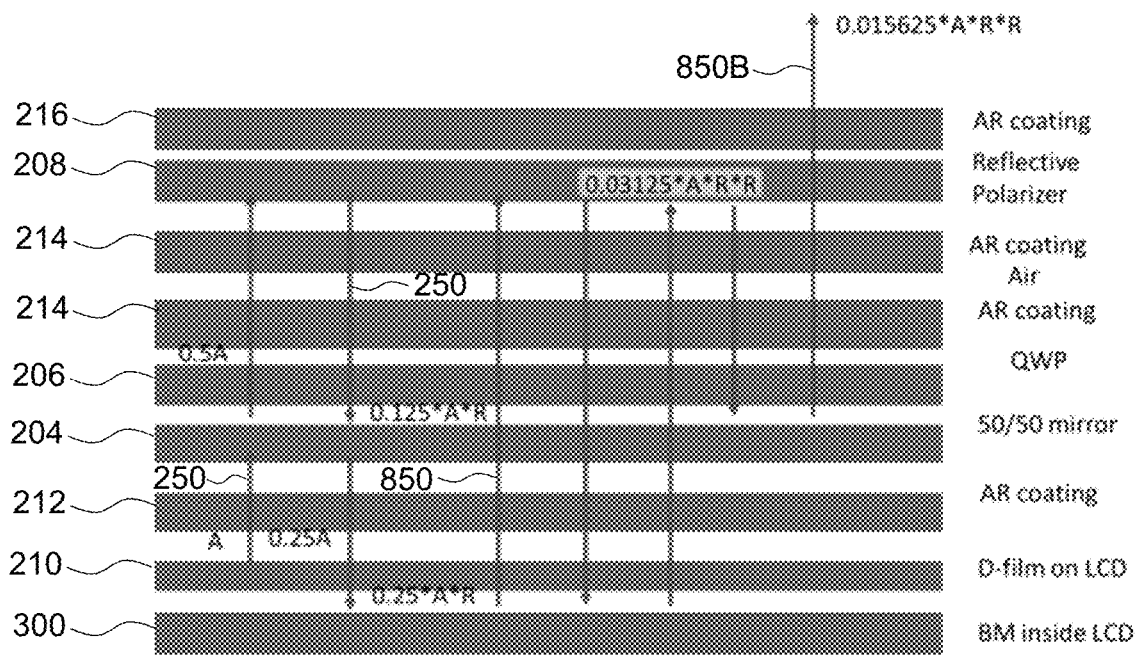

Turning to FIG. 8B, the optical path of the reflected portion 850B is similar to that of the reflected portion 850A of FIG. 8A, the difference being that after the second reflection from the reflective polarizer 208, the reflected light 850 propagates through the AR coating 212 and the D-film 210, making a second reflection from the finite reflectivity layer 300. Subsequently, the reflection 850 follows the path of the image light 250, propagating through various layers to the reflective polarizer 208, being reflected by the reflective polarizer 208, propagating through the AR coatings 214 and the QWP 206, being reflected by the partial reflector 204, propagating again through the QWP 206 and becoming linearly polarized. The amplitude of the resulting reflected portion 850B is approximately 0.015625*A*R*R.

Figure 8C:
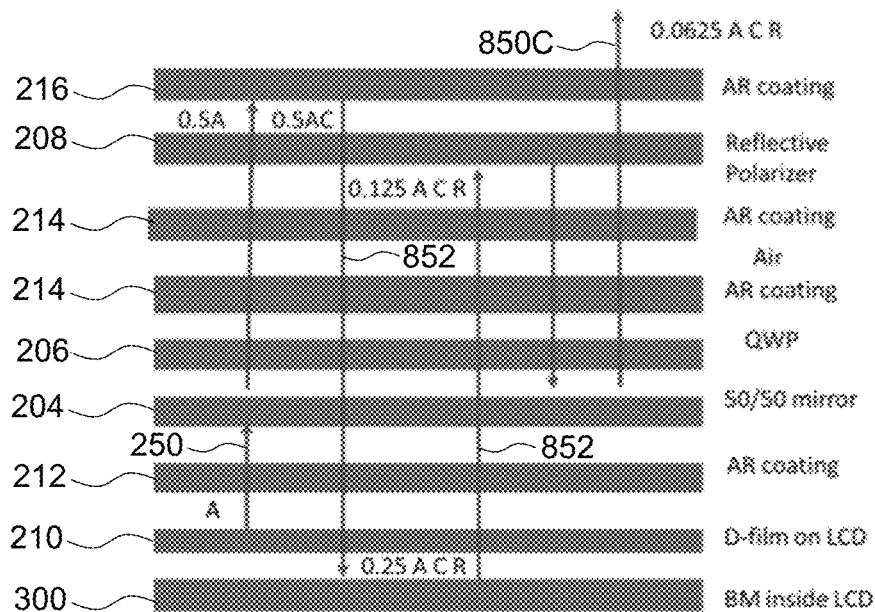

In FIG. 8C, the image light 250 propagates through the AR coating 212 of the D-film 210, the partial reflector 204 (50/50 mirror) and the QWP 206 of the first lens element 201 (FIG. 2A), AR coatings 214 of the QWP 206 (FIG. 8A), the second lens element 202, and the reflective polarizer 208, and is reflected from the top AR coating 216. From there, a reflection 852 propagates back all the way through the stack and is reflected by the finite reflectivity layer 300, e.g. BM layer. Subsequently, the reflection 850 follows the path of the image light 250, propagating through various layers to the reflective polarizer 208, being reflected by the reflective polarizer 208, propagating through the AR coatings 214 and the QWP 206, being reflected by the partial reflector 204, propagating again through the QWP 206 and becoming linearly polarized. The amplitude of the resulting reflected portion 850C is approximately 0.0625 A*C*R.

Figure 8D:
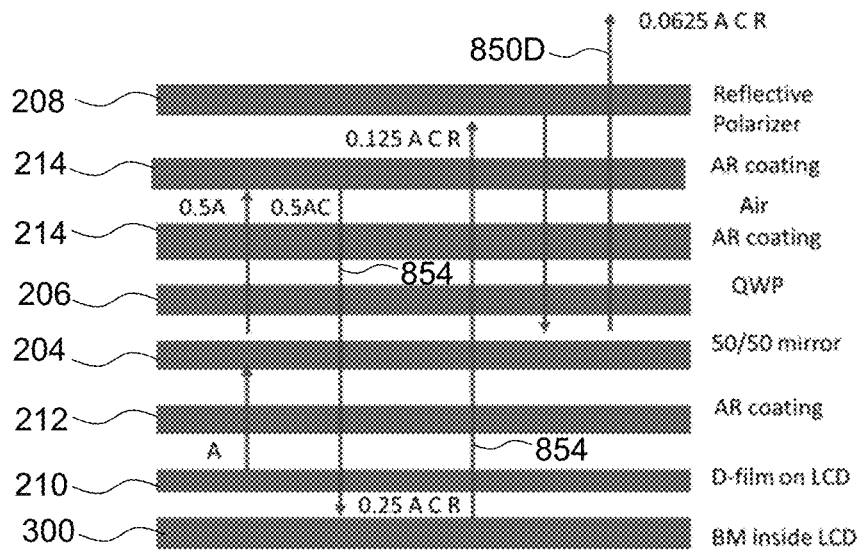

Referring now to FIG. 8D, the image light 250 propagates as in FIG. 8C, only is reflected from a different AR coating at top (214, not 216). Accordingly, the amplitude of the resulting reflected portion 850D after reflection of light 854 from the finite reflectivity layer 300 is approximately 0.0625 A*C*R.

Figure 9:
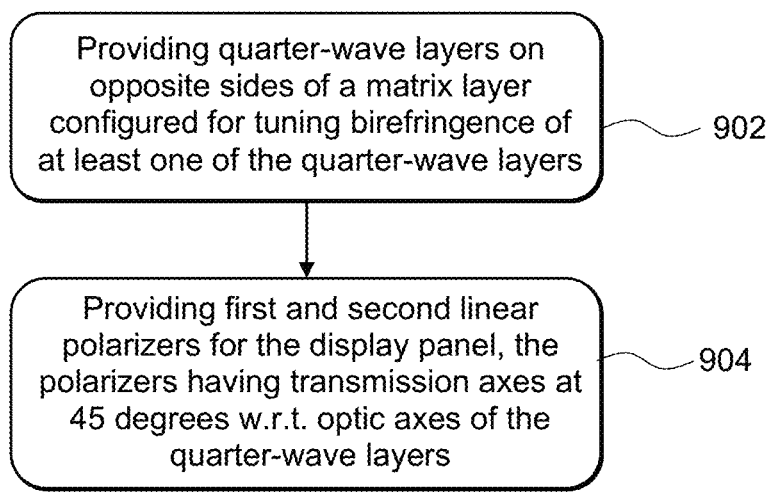
FIG. 9 is a flow chart of a method for ghost image reduction in a display device.

Turning to FIG. 9, a method 900 for ghost image reduction in a display device, e.g. the display device 100 of FIG. 1, comprising in succession a backlight, e.g. the backlight 104, a display panel, e.g. the display panel 102, and a pancake lens, e.g. the pancake lens 200 of FIG. 2A, includes providing (FIG. 9; 902) first and second quarter-wave layers for the display panel on opposite sides of a layer of an unwanted finite reflectivity, e.g. a matrix layer, of the display panel. The matrix layer is configured for tuning birefringence of at least one of the first or second quarter-wave layers in a spatially selective manner as has been explained above with reference to FIGS. 5A and 5B. First and second linear polarizers are provided (FIG. 9; 904) for the display panel. The linear polarizers may have transmission axes at substantially 45 degrees to optic axes of the first and second quarter-wave layers respectively. A stack of the first quarter-wave layer, the matrix layer, and the second quarter wave layer may be disposed between the first and second linear polarizers, e.g. as shown above with reference to FIGS. 5A and 5B.

In operation, light emitted by the backlight, propagated through the display panel and reflected by a layer in the pancake lens back to the display panel, propagates through the first linear polarizer, gets polarized by the first linear polarizer, propagates through the first quarter-wave layer, is reflected from the matrix layer, propagates again through the first quarter-wave layer thereby changing the polarization to an orthogonal polarization, and gets attenuated by the first linear polarizer, thereby reducing a ghost image caused by reflection from the finite reflectivity layer. The quarter-wave layers may be LC layers, LC polymer layers, retardation sheets, birefringent polymer sheets, zero-order or compound waveplates, etc. The switchable birefringent layer may include an LC layer, which may be configured for fringe field switching and/or in-plane switching. The waveplate may be configured to cancel out birefringence of the LC layer when in an undriven, i.e. not activated by the active matrix layer, state.

Following are example embodiments of the method 900.

Embodiment 1. A method for ghost image reduction in a display device comprising in succession a backlight, a display panel, and a pancake lens, the method comprising:

providing first and second birefringent layers for the display panel on opposite sides of a finite reflectivity layer of the display panel; and providing first and second polarizers for the display panel, wherein a stack of the first birefringent layer, the finite reflectivity layer, and the second birefringent layer is disposed between the first and second polarizers; wherein in operation, light emitted by the backlight, propagated through the display panel and reflected by a layer in the pancake lens back to the display panel, propagates through the first polarizer, gets polarized thereby, propagates through the first birefringent layer, is reflected from the finite reflectivity layer, propagates again through the first birefringent layer thereby changing polarization, and gets attenuated by the first polarizer, thereby reducing a ghost image caused by reflection from the finite reflectivity layer.

Embodiment 2. The method of Embodiment 1, wherein the finite reflectivity layer comprises a matrix layer configured for tuning birefringence of at least one of the first or second birefringent layers in a spatially selective manner, and wherein providing the first and second birefringent layers comprises providing a liquid crystal (LC) layer and a quarter-wave plate (QWP).

Embodiment 3. The method of Embodiment 2, further comprising configuring the QWP to cancel out birefringence of the LC layer when in an undriven state.

Figure 10:
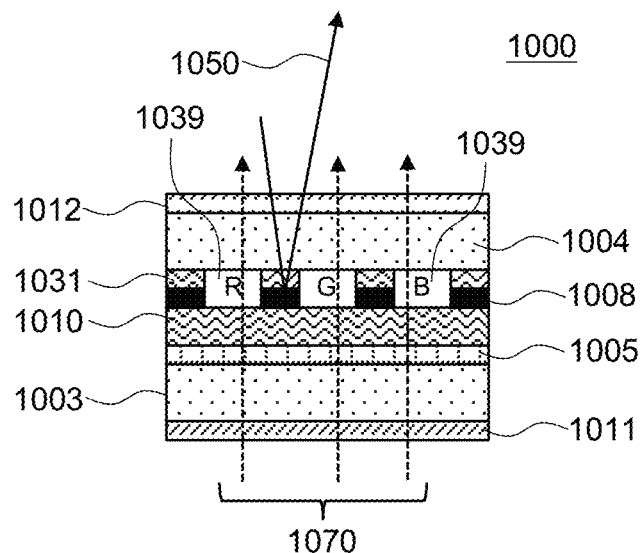
FIG. 10 is a side cross-sectional view of a display panel embodiment with a patterned top birefringent layer.

Referring now to FIG. 10 with further reference to FIGS. 1 and 5A, a display panel 1000 may be used as the display panel 102 of the display device 100 of FIG. 1 for providing images in linear domain while suppressing ghost images due to reflections in the display device 100. The display panel 1000 of FIG. 10 includes a bottom polarizer 1011 laminated onto a bottom (TFT) transparent substrate 1003 supporting a TFT layer 1005 on the inner side. A top transparent substrate 1004 supports a birefringent layer 1031, a black grid layer 1008 defining an array of pixels of the display panel 1000, and a color filter layer defining red (R), green (G), and blue (B) pixels, as shown. A top polarizer 1012 is laminated onto the top transparent substrate 1004. The substrates 1003 and 1004, together with the corresponding inner layers supported by the substrates, form a cavity, which is filled with an LC fluid 1010. In the embodiment shown in FIG. 10, the unwanted reflections may occur from the grid layer 1008. In other words, the finite reflectivity layer referred to above may include the grid layer 1008. The birefringent layer 1031 includes an array of openings 1039 coordinated with the array of pixels defined by the grid layer 1008. In operation, illuminating light 1070 propagated through the pixels propagates through corresponding openings 1039 of the array of openings 1039. The birefringent layer 1031 is configured to convert the polarization state of an image light portion 1050 (i.e. reflected light from the ocular lens, not shown in FIG. 10) propagating in sequence through the top polarizer 1012, the birefringent layer 1031 between the openings 1039, reflected from the grid layer 1008, and propagating back through the birefringent layer 1031 between the openings 1039 and towards the top polarizer 1012, to an orthogonal polarization state that is blocked by the top polarizer 1012, thereby reducing ghost image formation.

In the illustrated embodiment, the birefringent layer 1031 has a substantially zero optical retardation for the illuminating light 1070 propagated through the openings 1039 in the birefringent layer 1031, and a substantially an optical retardation of odd number of quarter-wavelengths for the image light portion 1050 propagated between the openings 1039 in the birefringent layer 1031, i.e. in the shaded areas of the birefringent layer 1031. The second birefringent layer may include a quarter-wave coating on the grid layer 1008, e.g. a polarization-selective subwavelength structure providing a corresponding magnitude of optical retardation.

Figure 11:
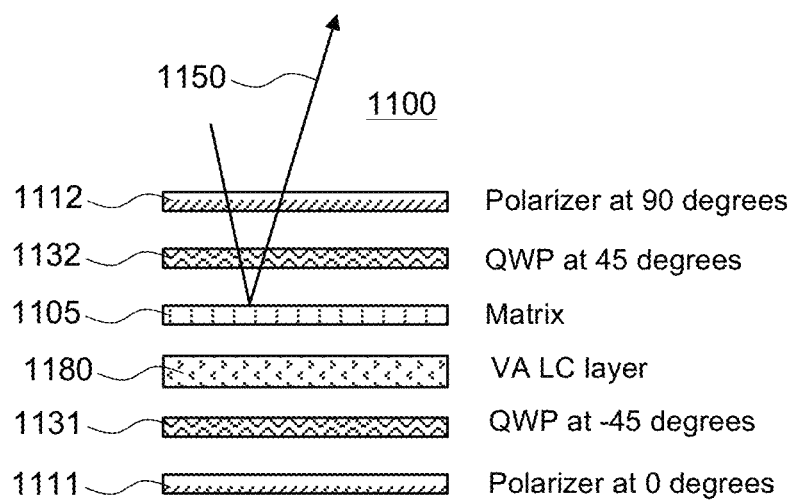
FIG. 11 is an exploded cross-sectional side view of an embodiment of a display panel with a vertically aligned LC layer.

Turning to FIG. 11 with further reference to FIG. 5A, an LC panel 1100 (FIG. 11) is similar to the LC panel 500A of FIG. 5A. The LC panel 1100 of FIG. 11 includes a first polarizer 1111, e.g. a linear polarizer, a first birefringent layer 1131, e.g. a quarter-wave plate with an optic axis at substantially 45 degrees, a matrix layer 1105 as a source of an unwanted ghost-causing reflection, and a second birefringent layer 1132, e.g. a quarter-wave plate with an optic axis at substantially −45 degrees, which cancels out the optical retardation of the first birefringent layer 1131. More generally, the first 1131 and second 1132 birefringent layers may each have an optical retardation of substantially an odd number of quarter-wavelengths. The LC panel 1100 further includes a vertically aligned LC layer 1180 adjacent the matrix layer 1105, i.e. an LC layer with LC molecules aligned substantially perpendicularly to the substrates in absence of electric field or at a pre-defined value of the electric field. The matrix layer 1105 is configured to tune the LC layer 1180 between a state having substantially zero optical retardation when the LC molecules are oriented vertically, and a state having non-zero optical retardation when the LC molecules are oriented at an acute angle to the substrates.

In operation, when the LC molecules of a pixel of the LC layer 1180 are aligned vertically, the optical retardations of the first 1131 and second 1132 birefringent layers cancel each other out and, with the retardation of the LC layer 1180 being close to zero and the first 1111 and second 1112 polarizers being crossed, the pixel is in the dark state. When the matrix layer 1105 tunes the LC layer 1180 to have a non-zero optical retardation, the pixel is in a light state. The second birefringent layer 1132 will suppress reflection of an image light portion 1150 in a manner similar to the LC panel 500A of FIG. 5A.

Figure 12:
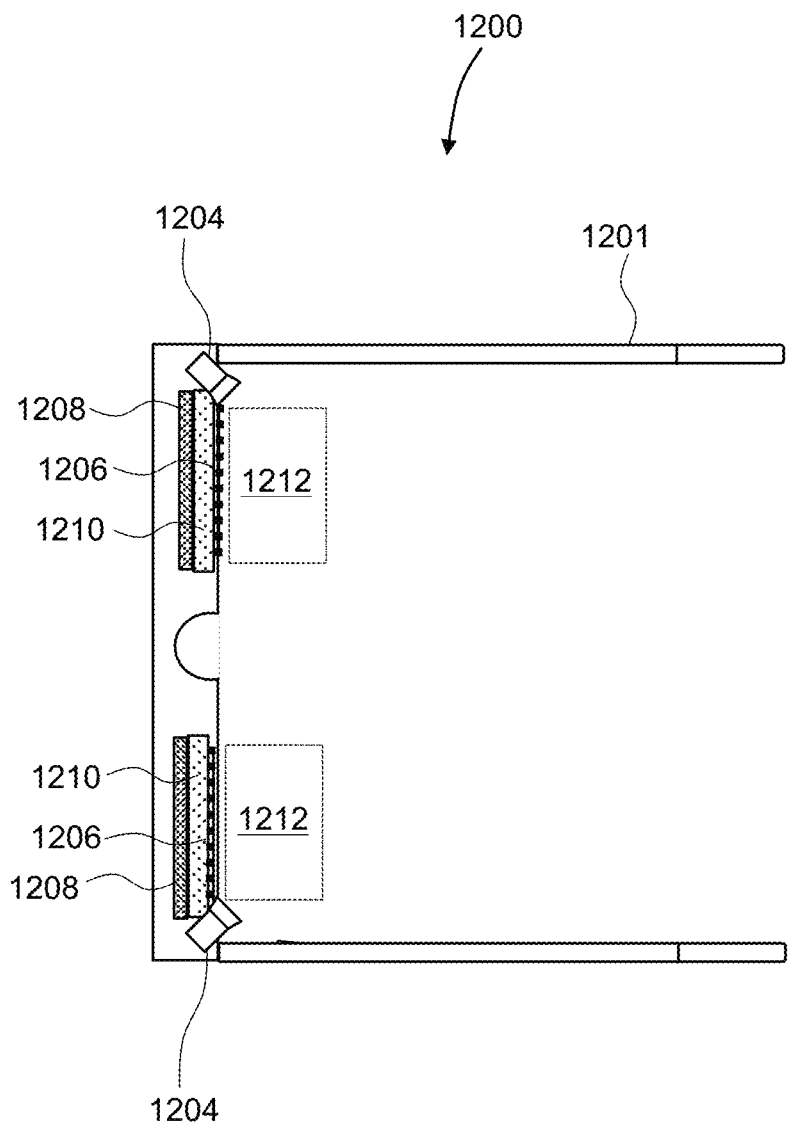
FIG. 12 is a top view of a near-eye display of this disclosure having a form factor of a pair of eyeglasses.

Referring to FIG. 12, an augmented reality (AR) near-eye display 1200 includes a frame 1201 having a form factor of a pair of eyeglasses. The frame 1201 supports, for each eye: an electronic display panel 1208, an ocular lens system 1210 optically coupled to the electronic display panel 1208, an eye-tracking camera 1204, and a plurality of illuminators 1206. The electronic display panel 1208 may include any of the display panels disclosed herein. The illuminators 1206 may be supported by the ocular lens system 1210 for illuminating an eyebox 1212. The electronic display panel 1208 provides an image in linear domain that is converted by the ocular lens system 1210 into an image in angular domain for observation by a user's eye.

The purpose of the eye-tracking cameras 1204 is to determine position and/or orientation of both eyes of the user. Once the position and orientation of the user's eyes are known, a gaze convergence distance and direction may be determined. The imagery displayed by the display panels 1208 may be adjusted dynamically to account for the user's gaze, for a better fidelity of immersion of the user into the displayed AR scenery, and/or to provide specific functions of interaction with the AR. In operation, the illuminators 1206 illuminate the eyes at the corresponding eyeboxes 1212, to enable the eye-tracking cameras 1204 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 1212.

Figure 13:
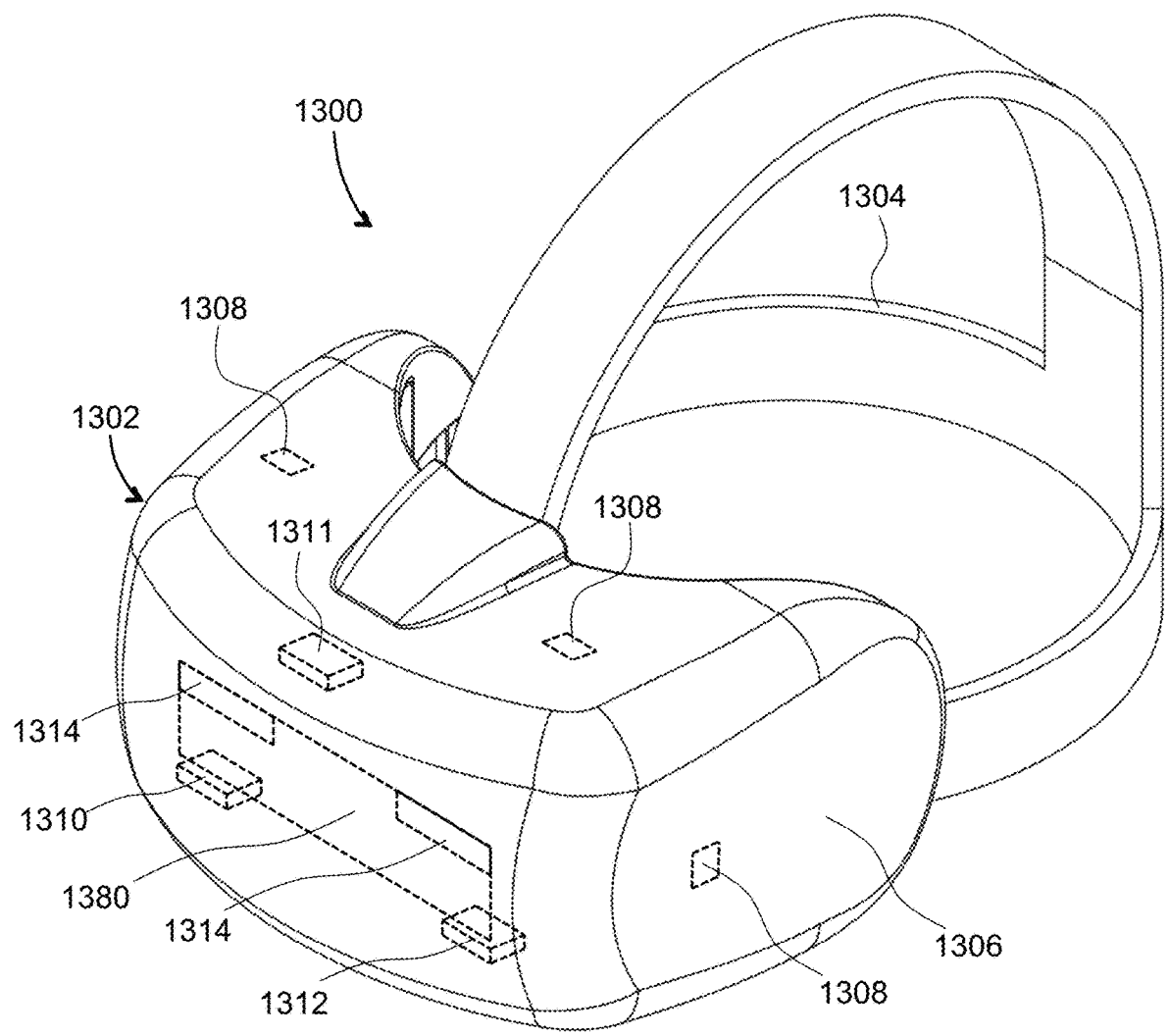
FIG. 13 is a three-dimensional view of a head-mounted display of this disclosure.

Turning to FIG. 13, an HMD 1300 is an example of an AR/VR wearable display system which encloses the user's face, for a greater degree of immersion into the AR/VR environment. The function of the HMD 1300 may be to generate the entirely virtual 3D imagery. The HMD 1300 may include a front body 1302 and a band 1304. The front body 1302 is configured for placement in front of eyes of a user in a reliable and comfortable manner, and the band 1304 may be stretched to secure the front body 1302 on the user's head. A display system 1380 may be disposed in the front body 1302 for presenting AR/VR imagery to the user. The display system 1380 may include any of the display panels disclosed herein. Sides 1306 of the front body 1302 may be opaque or transparent.

In some embodiments, the front body 1302 includes locators 1308 and an inertial measurement unit (IMU) 1310 for tracking acceleration of the HMD 1300, and position sensors 1312 for tracking position of the HMD 1300. The IMU 1310 is an electronic device that generates data indicating a position of the HMD 1300 based on measurement signals received from one or more of position sensors 1312, which generate one or more measurement signals in response to motion of the HMD 1300. Examples of position sensors 1312 include: one or more accelerometers, one or more gyroscopes, one or more magnetometers, another suitable type of sensor that detects motion, a type of sensor used for error correction of the IMU 1310, or some combination thereof. The position sensors 1312 may be located external to the IMU 1310, internal to the IMU 1310, or some combination thereof.

The locators 1308 are traced by an external imaging device of a virtual reality system, such that the virtual reality system can track the location and orientation of the entire HMD 1300. Information generated by the IMU 1310 and the position sensors 1312 may be compared with the position and orientation obtained by tracking the locators 1308, for improved tracking accuracy of position and orientation of the HMD 1300. Accurate position and orientation is important for presenting appropriate virtual scenery to the user as the latter moves and turns in 3D space.

The HMD 1300 may further include a depth camera assembly (DCA) 1311, which captures data describing depth information of a local area surrounding some or all of the HMD 1300. The depth information may be compared with the information from the IMU 1310, for better accuracy of determination of position and orientation of the HMD 1300 in 3D space.

The HMD 1300 may further include an eye tracking system 1314 for determining orientation and position of user's eyes in real time. The obtained position and orientation of the eyes also allows the HMD 1300 to determine the gaze direction of the user and to adjust the image generated by the display system 1380 accordingly. In one embodiment, the vergence, that is, the convergence angle of the user's eyes gaze, is determined. The direction and vergence may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1302.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include VR, AR, MR, hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A display panel comprising:
    a first birefringent layer for receiving light emitted by a backlight, wherein the light received by the first birefringent layer is polarized;
    a finite reflectivity layer for receiving the light propagated through the first birefringent layer;
    a second birefringent layer for receiving the light propagated through the finite reflectivity layer; and
    a first polarizer for receiving the light propagated through the second birefringent layer;
    wherein the second birefringent layer is configured to convert a polarization state of an image light portion propagating in sequence through the first polarizer, the second birefringent layer, reflected from the finite reflectivity layer, and propagating back through the second birefringent layer towards the first polarizer, to an orthogonal polarization state that is blocked by the first polarizer.

2. The display panel of claim 1, further comprising a second polarizer for polarizing the light emitted by the backlight.

3. The display panel of claim 1, wherein at least one of the first or second birefringent layers has an optical retardation of substantially an odd number of quarter-wavelengths.

4. The display panel of claim 1, wherein:
    the finite reflectivity layer comprises a grid layer defining an array of pixels of the display panel;
    the second birefringent layer comprises an array of openings coordinated with the array of pixels, such that in operation, the light propagated through pixels of the array of pixels propagates through corresponding openings of the array of openings; and wherein the second birefringent layer is configured to convert the polarization state of the image light portion propagating in sequence through the first polarizer, the second birefringent layer between the openings, reflected from the grid layer, and propagating back through the second birefringent layer between the openings and towards the first polarizer, to the orthogonal polarization state.

5. The display panel of claim 4, wherein the second birefringent layer has a substantially zero optical retardation for light propagated through the openings in the second birefringent layer, and a substantially an optical retardation of odd number of quarter-wavelengths for light propagated between the openings in the second birefringent layer.

6. The display panel of claim 4, wherein the second birefringent layer comprises a quarter-wave coating on the grid layer.

7. The display panel of claim 1, wherein the first birefringent layer comprises a liquid crystal layer having an optical retardation of substantially an odd number of half-wavelengths, wherein the finite reflectivity layer comprises a matrix layer configured for tuning the optical retardation of the liquid crystal layer in a spatially-selective manner.

8. The display panel of claim 7, wherein the matrix layer comprises a thin film transistor (TFT) matrix layer.

9. The display panel of claim 1, wherein the finite reflectivity layer comprises at least one of: a black grid, a color filter matrix, or a thin film transistor (TFT) matrix for tuning the optical retardation of at least one of the first or second birefringent layers in a spatially selective manner, wherein the at least one of the first or second birefringent layers comprises a liquid crystal (LC) layer.

10. The display panel of claim 9, wherein liquid crystals of the LC layer have an optical birefringence of less than 0.2.

11. The display panel of claim 1, wherein the finite reflectivity layer comprises a matrix layer, the display panel further comprising a vertically aligned liquid crystal (LC) layer adjacent the matrix layer, wherein:
the matrix layer is configured to tune the LC layer between a state having substantially zero optical retardation and a state having a non-zero optical retardation; and
optical retardations of the first and second birefringent layers cancel each other out.

12. The display panel of claim 11, wherein the first and second birefringent layers each have an optical retardation of substantially an odd number of quarter-wavelengths.

13. A display panel comprising:
a grid layer having a finite reflectivity, for receiving polarized light emitted by a backlight;
a liquid crystal (LC) layer, wherein the grid layer defines an array of LC pixels in the LC layer, wherein optical retardation of pixels of the array of LC pixels is individually controllable; and
a patterned birefringent layer comprising an array of openings therein coordinated with the array of LC pixels, such that in operation, the light propagated through the LC pixels propagates through openings of the array of openings; and a polarizer for receiving the light propagated through the array of LC pixels and the array of openings, thereby forming image light;
wherein the patterned birefringent layer is configured to convert a polarization state of a portion of the image light reflected towards the polarizer and propagating in sequence through the polarizer and the patterned birefringent layer between the openings, reflected by the grid layer, and propagating back through the birefringent layer between the openings towards the polarizer, to an orthogonal polarization state that is blocked by the polarizer.

14. The display panel of claim 13, wherein the patterned birefringent layer has an optical retardation of substantially an odd number of quarter-wavelengths.

15. A display device comprising:
first and second polarizers;
a backlight coupled to the second polarizer;
a first birefringent layer for receiving light emitted by the backlight and polarized by the second polarizer;
a grid layer for receiving and spatially modulating at least one of polarization or color of the light propagated through the first birefringent layer;
a second birefringent layer for receiving the light propagated through the grid layer, wherein the first polarizer is disposed for receiving the light propagated through the second birefringent layer; and
a lens optically coupled to the first polarizer for forming an image in angular domain from an image in linear domain formed at the first polarizer;
wherein the second birefringent layer is configured to convert the polarization state of a portion of the light reflected by the lens towards the first polarizer and propagating in sequence through the first polarizer, the second birefringent layer between the openings, reflected from the grid layer, and propagating back through the second birefringent layer between the openings and towards the first polarizer, to an orthogonal polarization state that is blocked by the first polarizer.

16. The display device of claim 15, wherein the grid layer comprises at least one of: a color filter matrix; a black grid; or a thin film transistor (TFT) matrix for tuning optical retardation of at least one of the first or second birefringent layers in a spatially-selective manner.

17. The display device of claim 16, wherein the grid layer comprises the TFT matrix, wherein the at least one of the first or second birefringent layers comprises a liquid crystal (LC) layer, and wherein the TFT matrix is configured for tuning optical retardation of the LC layer in the spatially-selective manner.

18. The display device of claim 15, wherein the lens comprises a pancake lens.

19. The display device of claim 18, wherein the pancake lens comprises a first lens element optically coupled to the first polarizer, and a second lens element optically coupled to the first lens element.

20. The display device of claim 19, wherein the first lens element comprises a curved partial reflector, and wherein the second lens element comprises a curved reflective polarizer.

* * * * *